United States Patent [19]
Kirschenbaum et al.

[11] Patent Number: 6,003,058
[45] Date of Patent: Dec. 14, 1999

[54] APPARATUS AND METHODS FOR PERFORMING ARITHIMETIC OPERATIONS ON VECTORS AND/OR MATRICES

[75] Inventors: Jacob A. Kirschenbaum, Hadera; Itzhak Barak, Tel Aviv; Yacov Efrat, Omer, all of Israel; Shao Wei Pan, Lake Zurich, Ill.

[73] Assignee: Motorola, Inc., Schaumburg, Ill.

[21] Appl. No.: 08/924,288

[22] Filed: Sep. 5, 1997

[51] Int. Cl.[6] .................................................. G06F 17/16
[52] U.S. Cl. ............................................. 708/607; 708/517
[58] Field of Search ..................... 364/736.03, 754.02, 364/748.5, 748.2, 748.18; 708/607, 517, 512

[56] References Cited

U.S. PATENT DOCUMENTS

5,301,342   4/1994   Scott .................................. 364/754.02
5,325,215   6/1994   Shibata et al. ..................... 364/736.03
5,771,391   6/1998   Lloyd et al. ......................... 364/748.5

*Primary Examiner*—David H. Malzahn
*Attorney, Agent, or Firm*—James E. Gauger

[57] ABSTRACT

A multiply-multiply-accumulate (MMA) system (10) efficiently evaluates matrix products X=F*C. Matrix C is dissected into submatrices A and B taking advantage of symmetry in C. LOG unit (14) converts B, A, and F to LOG values B', A' and F'. These are summed in K parallel calculating units CU's (18) and converted back to Normal domain as P=F*B*A in ALOG units (22) and sent to accumulators ACU's (24). The ACU's (24) accumulate the results. An output buffer (26) combines the results. The B', A' values (32,34) are held in a cache memory (20) and the LOG sums are performed in two steps with intermediate storage.

26 Claims, 5 Drawing Sheets

FIG. 6

| | CU 1 | CU 2 | CU 3 | CU 4 | CU 5 | ... | CU 9 | ... | CU 64 |
|---|---|---|---|---|---|---|---|---|---|
| ROW 1 | A1,1 | A1,2 | A1,3 | A1,4 | A1,5 | ... | A1,9 | ... | A1,64 |
| ROW 2 | A2,1 | A2,2 | A2,3 | A2,4 | A2,5 | ... | A2,9 | ... | A2,64 |
| ROW 3 | A3,1 | A3,2 | A3,3 | A3,4 | A3,5 | ... | A3,9 | ... | A3,64 |
| ... | ... | ... | ... | ... | ... | | ... | | ... |
| ROW 8 | A8,1 | A8,2 | A8,3 | A8,4 | A8,5 | ... | A8,9 | ... | A8,64 |
| ROW 9 | B1,1 | B1,2 | B1,3 | B1,4 | B1,5 | ... | B1,9 | ... | B1,64 |
| ROW 10 | B2,1 | B2,2 | B2,3 | B2,4 | B2,5 | ... | B2,9 | ... | B2,64 |
| ROW 11 | B3,1 | B3,2 | B3,3 | B3,4 | B3,5 | ... | B3,9 | ... | B3,64 |
| ... | ... | ... | ... | ... | ... | | ... | | ... |
| ROW 16 | B8,1 | B8,2 | B8,3 | B8,4 | B8,5 | ... | B8,9 | ... | B8,64 |
| DATA | F1 | F2 | F3 | F4 | F5 | ... | F9 | ... | F64 |

PPU-1 ⟶ F1B11A11+ F2B11A21+ F3B11A31+ F4B11A41+ F5B11A51+ ... F9B21A11+ ... F64B81A81 =X1,1
PPU-2 ⟶ F1B12A12+ F2B12A22+ F3B12A32+ F4B12A42+ F5B12A52+ ... F9B22A12+ ... F64B82A82 =X1,2
...
PPU-64 ⟶ F1B164A164+ F2B164A264+ F3B164A364+ F4B164A464+ F5B164A564+ ... F9B264A164+ ... F64B864A864 =X1,64

TIME ⟶

APPARATUS AND METHODS FOR PERFORMING ARITHIMETIC OPERATIONS ON VECTORS AND/OR MATRICES

FIELD OF THE INVENTION

This invention relates to improved means and methods for digital multiplication of matrices and other mutivalued quantities or vectors.

RELATED INVENTIONS

The present invention is related to the following inventions which are assigned to the same assignee as the present invention:

1. "Computer Processor Utilizing Logarithmic Conversion and Method of Use Thereof", having Serial No. 08/403,158, filed on Mar. 3, 1995;
2. "Exponentiator Circuit Utilizing Shift Means and Method of Using Same", now U.S. Pat. No. : 5,553,012;
3. "Accumulator Circuit and Method of Use Thereof", now U.S. Pat. No. : 5,644,520.
4. "Logarithm/Inverse-Logarithm Converter Utilizing Linear Interpolation and Method of Using Same", now U.S. Pat. No. : 5,600,581;
5. "Logarithm Converter Utilizing Offset and Method of Using Same", now U.S. Pat. No. : 5,629,884;
6. "Computer Processor having a Pipelined Architecture and Method of Using Same", Ser. No. 08/520,666, filed Aug. 8, 1995;

The foregoing are incorporated herein by reference.

BACKGROUND OF THE INVENTION

It is often necessary in the electronic arts to evaluate expressions of the general form given in Eq. (1):

$$X^{(I,J)}=F^{(I,N)}*C^{(N,J)} \quad (1)$$

where $X^{(I,J)}$ is a matrix with dimensions (I,J), $F^{(I,N)}$ is a matrix with dimensions (I,N) and $C^{(N,J)}$ is a matrix with dimensions (N,J). For example, F can be a data stream while C is a coefficient matrix. F can also be a vector, i.e., a one-dimensional matrix.

It is known that such expressions can be evaluated by means of the following equation:

$$X(i,j) = \sum_{p=1}^{N} F(i,p) * C(p,j) \quad (2)$$

where i, j and p are indices. Examples of such functions are the Forward Discrete Cosine Transform (FDCT) and the Inverse Discrete Cosine Transform (IDCT) and Two Dimensional Discrete Fourier Transform (2-d DFT), and general matrix multiplication. Operations of the type illustrated by Eq. 2 are referred to generally as a Multiply-Accumulate, abbreviated as MA.

Because of the importance of MA operations in modem electronics, especially in communication electronics, there is an ongoing need for means and methods which permit MA operations to be carried out more quickly or with fewer resources or both. For example, it desirable to be able to perform such operations with simpler or more compact or higher speed microelectronic circuits or less on-chip memory or combinations of such advantages. It is especially desirable to be able to evaluate MA expressions such as Eqs. (1)–(2) while using less on-chip cache memory space.

BRIEF DESCRIPTION OF THIE DRAWINGS

FIG. 4 is a simplified block diagram illustrating in further detail the functioning of the present invention;

FIG. 6 is a simplified table illustrating how the means and method of the present invention produces a desired result.

DETAILED DESCRIPTION OF THE PREFERRED EMBODIMENT

It has been found that in many cases of great practical interest, the equivalent of an MA operation can be performed much more efficiently by first dissecting one of the matrices, e.g., matrix C in Eqs. (1)–(2), into the two submatrices A and B and then performing a Multiply-Multiply-Accumulate (MMA) operation using these submatrices, taking advantage of symmetry in the C matrix. The present invention provides a computer system and method that is especially adapted to perform this an other similar calculations. The amount of memory needed and the execution time for obtaining the desired result are significantly reduced.

Figure 1:
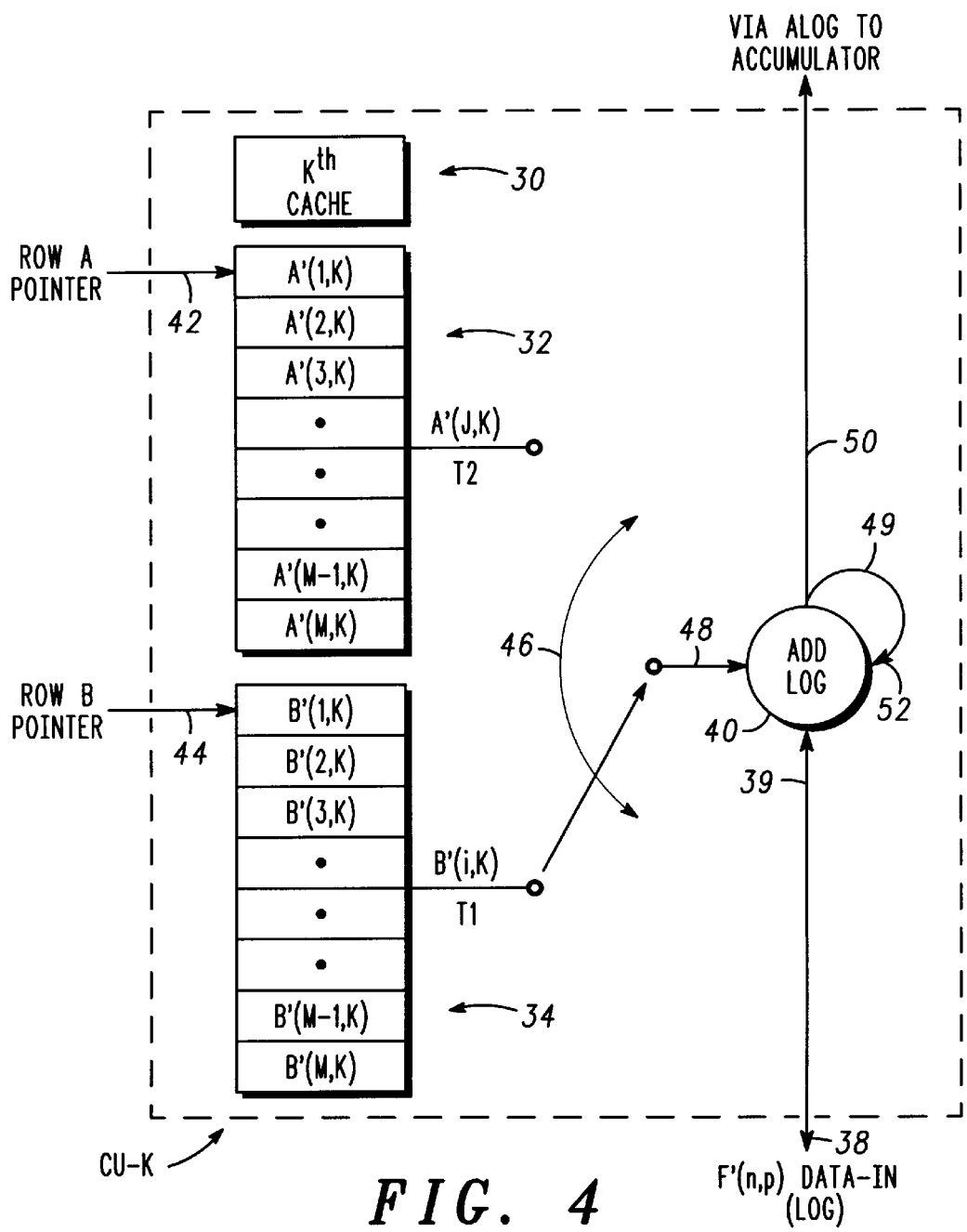
FIG. 1 is a schematic diagram illustrating the factoring of a large matrix into the product of two smaller matrices.

FIG. 1 illustrates schema'ticaly the factoring of matrix C of dimensions N×N into a product of two smaller matrices B and A of dimensions M×N, defined by the following equation:

$$C(p,k)=B(i,k)*A(j,k), \quad (3)$$

where i, j are indices in the range 1 to M and p takes on values given by p=M(i−1)+j, and k=1, 2, . . . , N. For example, if N=64,and M=8,then p runs from 1 to 64,that is: p=1 when i=j=1 . . .p=9when i=2and j=1 . . . p=64 when i=8 and j=8, and so forth.

It is not essential that matrix C be square, that is, N×N. C can have dimensions N×W, in which case A and B are M×W and k runs from 1 to W. However, unless otherwise specifically noted, it is assumed in the description that follows that C has dimensions N×N. This is merely for convenience of explanation and not intended to be limiting. Persons of skill in the art will understand based on the description herein how to apply these teachings to a situation of matrix C with dimensions N×W or other dimensions.

Each term in the C matrix is formed by the product of a term in the B and A matrices. For example, evaluating Eq. 3 for the case of N=64, M=8:

$$\left. \begin{array}{l} C(1,1) = B(1,1)*A(1,1) \\ C(1,2) = B(1,2)*A(1,2) \\ C(2,2) = B(1,2)*A(2,2) \\ \quad \vdots \quad \vdots \quad \vdots \\ C(64,32) = B(8,32)*A(8,32) \\ \quad \vdots \quad \vdots \quad \vdots \\ C(64,64) = B(8,64)*A(8,64). \end{array} \right\} \quad (3.1)$$

The following is an explanation orhow matrices A and B can be obtained.

If C(p,k)>0, then from Eq. (3) one obtains:

$$\log C(p,k) = \log [C(p,k)] = \log [B(i,k)] + \log [A(j,k)] \quad (3.2)$$

and using primes to indicate log values (i.e., C'=log C, b'=log B, A'=log A, etc.), Eq. (3.2) is written as:

$$C'(p,k) = B'(i,k) + A'(j,k) \quad (3.3)$$

and since p=M(i−1)+j, then $$C'(M(i-1)+j,k) = B'(i,k) + A'(j,k). \quad (3.4)$$

For every column vector of C, one solves the following set of linear equations:

$$\left.\begin{array}{c} B'(1,k) + A'(1,k) = C'(1,k) \\ B'(1,k) + A'(2,k) = C'(2,k) \\ \vdots \quad \vdots \quad \vdots \\ B'(1,k) + A'(M,k) = C'(M,k) \\ B'(2,k) + A'(1,k) = C'(M+1,k) \\ \vdots \quad \vdots \quad \vdots \\ B'(M,k) + A'(M,k) = C'(N,k) \end{array}\right\} \quad (3.5)$$

In the special case that C(M(i−1)+j,k)=0, then this means that either the corresponding B'(i,k)=0 (referred to as "case b") or the corresponding A'(j,k)=0 (referred to as "case i"). So, instead of C(M(i−1)+j,k)=0, if one chooses case a, then for every occurrence of case a in Eq (3.5) one puts in "0", and, if one chooses case b, then for every occurrence of case b in Eq (3.5) one puts in "0".

For example, assume that C(2,1)=0, then by choosing A(2,1)=0, Eq. set (3.5) becomes:

$$\left.\begin{array}{c} B'(1,k) + A'(1,k) = C'(1,k) \\ \vdots \quad \vdots \quad \vdots \\ B'(1,k) + A'(M,k) = C'(M,k) \\ B'(2,k) + A'(1,k) = C'(M+1,k) \\ B'(2,k) = C'(M+1,k) \\ \vdots \quad \vdots \quad \vdots \\ B'(M,k) + A'(M,k) = C'(N,k) \end{array}\right\} \quad (3.6)$$

wherein the constraint C'(2,1) is eliminated and all occurrences of A(2,1) disappear.

If C(p,k)<0, then the same procedure is followed for |C(p,k)| and one obtains the vectors A(i,k) and B(j,k) which contain non-negative numbers. One changes the signs of A(i,k), B(j,k) and solves the set of simultaneous equations (which are expressed in Eq. 3.7 as products):

$$\left.\begin{array}{c} B(1,k) * A(1,k) = C(1,k) \\ B(1,k) * A(2,k) = C(2,k) \\ \vdots \quad \vdots \quad \vdots \\ B(1,k) * A(M,k) = C(M,k) \\ B(2,k) * A(1,k) = C(M+1,k) \\ \vdots \quad \vdots \quad \vdots \\ B(M,k) * A(1,k) = C(N,k) \end{array}\right\} \quad (3.7)$$

analogously to the manner previously described.

Let F be a vector, that is, a matrix with dimensions 1×N. Then, F(1,p)=F(p)=F''(i,j) where i and j are in the range of 1 to M. As is well known in the art, vector F(p) can be represented as a matrix F''(i,j) by wrapping and vice, versa.

Then, Eqs. (4) and (4.1) are equivalent:

$$X(1,k) = \sum_{i=1}^{M} \sum_{j=1}^{M} F(1,p) * B(i,k) * A(j,k), \text{ and} \quad (4)$$

$$X(1,k) = \sum_{i=1}^{M} \sum_{j=1}^{M} F''(i,j) * B(i,k) * A(j,k), \text{ and} \quad (4.1)$$

where, as before, p=M(i−1)+j. Stated more generally, for the same conditions of p=M(i−1)+j, then Eq. (5) applies:

$$X(n,k) = \sum_{i=1}^{M} \sum_{j=1}^{M} F''(n,p) * B(i,k) * A(j,k), \text{ and} \quad (5)$$

It has been found that Eqs. (2)–(5) can be evaluated very efficiently by means of the computer system shown in FIGS. 2–3 employing K parallel calculating means (individually "k"), which evaluate the function:

$$F(n,p) * B(i,k) * A(j,k) \quad (6)$$

for p=M(i−1)+j. Eq. (6) is evaluated in a single clock cycle in each of the k parallel computing means and accumulated over successive clock cycles to obtain X(n,k).

Figure 2:
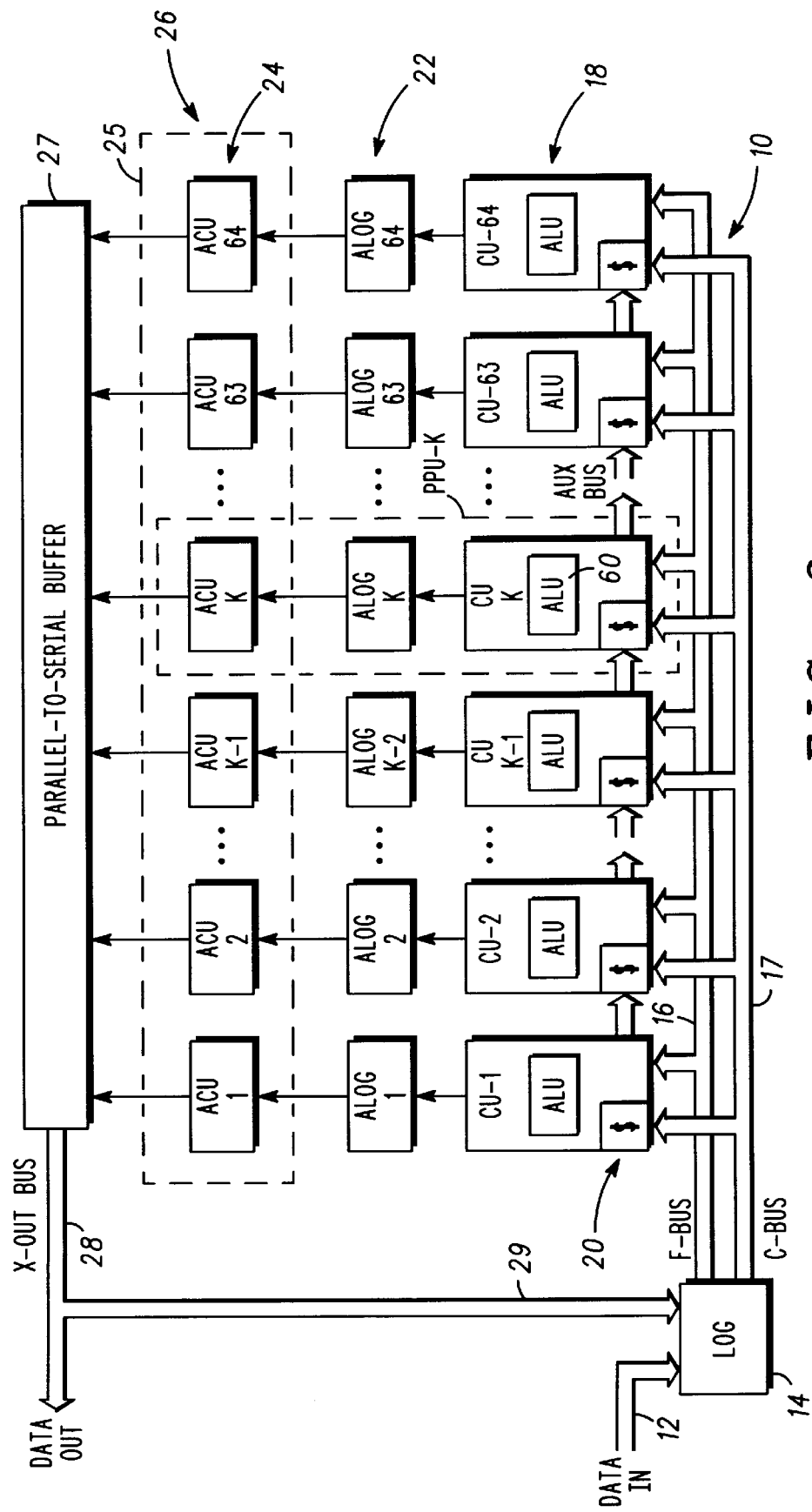
FIG. 2 is a implified block diagram of a computational system according to the present invention.
Figure 3:
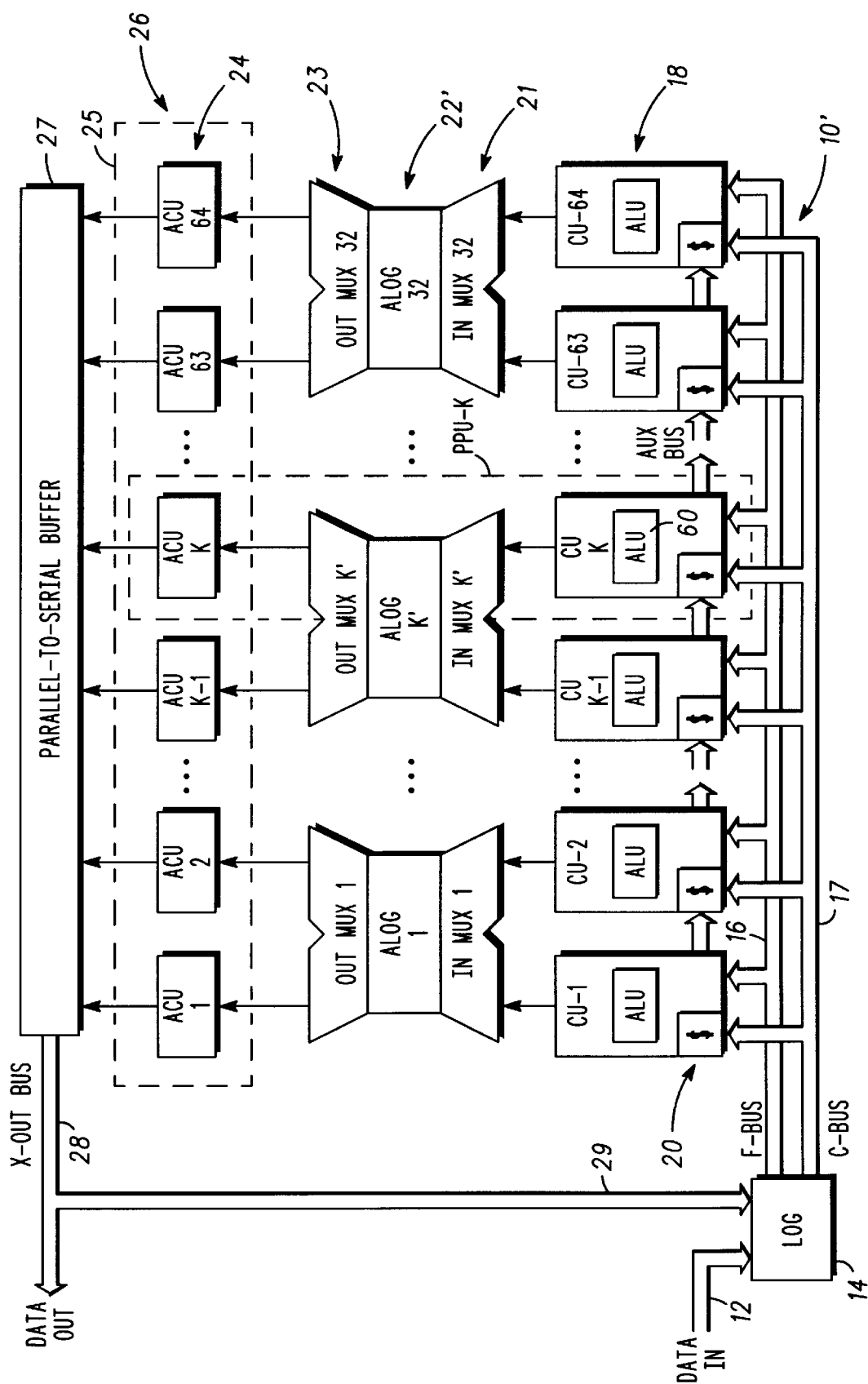
FIG. 3 is a simplified block diagram of a computational system according a further embodiment of the present invention

FIG. 2 is a simplified block diagram of parallel processing system 10 according to the present invention. FIG. 3 is similar to FIG. 2 but according to a further embodiment denoted by system 10'. Like reference numbers identify like elements in the figures and primed reference numbers (e.g., 10, 10'; 22, 22') or letters (e.g., k,k') in FIGS. 2–3 identify functionally equivalent elements.

System 10, 10' accepts input data in the NORMAL domain and, preferably, provides output data in the NORMAL domain. However, internally, a portion of the data processing occurs in the LOG domain. The input data and output data can represent any desired quantity. The system is especially useful, for example, for the processing of video and other information where the input data represents quantized pixel elements in an array or subarray of an image. However, many other types of input data can be processed with the system and method of the present invention and this example is not intended to be limiting. Various features of systems generally similar to system 10, 10' are described in copending applications or patents [1]–[6] and further details can be found therein. However, the explanation included here is sufficient for those of skill in the art to understand and practice the present invention without undue experimentation.

The words "NORMAL domain" refer to real or complex numbers in any desired representation. The words "LOG domain" refer to numbers which are expressed in logarithmic notation and having a mantissa and exponent. Any basis can be used for the logarithms but base 2 is preferred.

In the discussion that follows, the variable F is used to identify Input Data and A, B and C (where C=f(B,A) according to Eq. (3)) are used to identify, for example, coefficients or other normalizing or transforming factors that are being applied to data F to obtain the desired result X according to Eq. (5). When in the NORMAL domain, F, C, B and A are unprimed. Data and coefficient values in the LOG domain are distinguished by use of primes, e.g., F'=log F, B'=log B and A'=log A and so forth. The correspondence between a LOG sum an its equivalent NORMAL product is indicated in a similar manner.

In the discussion herein, the word "data" is used in referring to the values of the variable F and the words "coefficient" or "coefficient value", singular or plural, are used to refer to the values of A and B, but this is merely for convenience of explanation and not intended to be limiting. Persons of skill in the art will understand that the values of F, A and B can represent any physical quantity or number or other parameter and the words "data" and "coefficient" are to be interpreted in their broadest sense.

Input data or coefficient values in the NORMAL domain present on system input bus 12 are delivered to LOG unit 14. LOG unit 14 converts the NORMAL input data or coefficients (e.g., real or imaginary numbers) into, preferably, fixed point logarithms having exponent and mantissa. LOG input data are exported to system internal bus 16 (F-BUS). LOG coefficients are preferably exported to cache bus 17 (C-BUS) for transfer to cache memory 20 but, as is explained later, this is only one of several ways for loading coefficients.

The sign values associated with the NORMAL domain data and coefficients are preferably stripped off in the LOG conversion process and passed to ALOGs 22 where they are reintroduced as the LOG sums of the LOG data and LOG coefficients are reconverted to NORMAL domain as products. Sign values associated with the coefficients are preferably stored in cache 20 so that they arrive at ALOG 22 at the correct time to be combined with the resulting data x coefficient products, but this not essential and any arrangement for assigning the correct sign to the resulting NORMAL domain products can be used.

F-BUS Bus 16 couples the LOG input data to calculation units (CU's) 18. In the examples of FIGS. 2–3, processor 10, 10' has 64 CU's identified as CU-1 to CU-64. CU-k refers to the kth calculation unit (CU). PPU-k refers to the kth parallel processing unit (PPU) or means. For example, PPU-k denotes the combination of CU-k and its associated antilog unit (ALOG-k or ALOG k') and accumulator unit (ACU-k). In system 10' of FIG. 3, multiplexers 21 (e.g., IN-MUX k' and OUT-MUX k') are placed at the input and output of ALOG k' so that adjacent CU's and ACU's (e.g., CU-k and CU-(k−1), ACU-k and ACU-(k−1)) can share a common ALOGk'. Thus, in FIG. 3, there are half as many ALOG units as in FIG. 2. Otherwise the operation of systems 10 and 10' are substantially the same. The implementation of FIG. 3 is preferably when total chip area is relatively more important than execution speed and the implementation of FIG. 2 is preferable when execution speed is relatively more important than chip area. Persons of skill in the art understand how to balance conflicting demands. Larger or smaller numbers of CU's can also be used and the number $k_{max}=K=64$ shown here is merely for convenience of explanation and not intended to be limited.

It is preferable that each CU 18 has cache memory 20, identified by the symbol "$". In the preferred embodiment, memory 20 in each CU has 128 rows of 34 bit words per row of associative SRAM. Memories 20 taken together can be viewed as one big cache memory of 128 rows of 34 bit words in 64 columns, where each column is associated with one CU and PPU. However, larger or smaller amounts of memory can be included in cache 20. A system buffer memory (not shown) can be used in connection with input bus 12 or output 28 or both to provide storage for input or output data or both, but this is not essential.

LOG input data values are loaded into CU's 18 from F-BUS 16. Coefficient values (e.g., in the LOG domain) can be loaded in caches 20 from F-BUS 16 or via separate C-BUS 17. Either arrangement is useful. Coefficient values can also be transferred from CU-k to or from and adjacent CU-(k±1) via an auxiliary bus (e.g., AUX-BUS in FIGS. 2–3), but that is not essential for the present invention. Coefficient values are preferably stored in cache 20 in the LOG domain, but this is not essential. They can also be stored in the NORMAL domain and the LOG conversion done prior to transferring them to ALU's 60. What is important is that they be in the LOG domain when provided to arithmetic logic unit (ALU) 60 of each CU. The function of ALU's 60 is explained in more detail in connection with FIGS. 4–5. For convenience of explanation it is assumed in the discussion that follows that the coefficient values are stored in cache 20 in LOG domain form.

CU's 18 have their outputs coupled to ALOG units 22,22' which take the anti-log of the intermediate LOG values provided by CU's 18 and produce at their outputs corresponding values in the NORMAL domain. The output of each ALOG-k is coupled to the input of a corresponding accumulator unit (ACU-k) 24. In FIG. 3, k'=k/2 for k even.

ACU's 24 can function as individual adders, e.g., one for each PPU-k, or can be interconnected as indicated by the dashed outline 25 to form adder tree 26, depending upon the combination of Multiply—Multiply (MM) terms desired to be accumulated by the user. Examples of various adder trees are shown in several of the incorporated references [1]–[6], but other adder tree formulations well known in the art can also be employed.

The outputs of ACU's 24 or adder tree 26 are coupled to Parallel-to-Serial Buffer (PTSB) 27. In the preferred embodiment, PTSB 27 has 64 input taps in FIGS. 2–3, and provides the system output on X-OUT BUS 28. The system output is preferably in the NORMAL domain. The output can be coupled back to LOG unit 14 via bus 29, according to the function desired to be evaluated by system 10. In the preferred embodiment for evaluating expressions of the type shown in the above-noted equations, feedback bus 29 is not needed.

It is assumed hereafter that the arrangement of FIG. 2 is used and references to system 10 are intended to include system 10'. This is merely for convenience of explanation and people of skill in the art will understand that either arrangement works. Other modifications to the arrangement of system 10, which will be apparent based on the description herein, can also be made.

Every CU 18 preferably has cache 20. Cache 20 is desirably of high speed SRAM so as to not to significantly limit the overall system performance. Such type of memory is comparatively large, that is, it occupies significant microchip area. Also, while new data is being loaded into the cash, it is normal to suspend other operations. Hence it is desirable to configure and operate system 10 in such a way as to minimize the size of the cache memory as much as possible, and to minimize the number of cash reloads that are needed to compute a desired matrix product. By reducing the size of each cache reload, as is accomplished by the present invention, the system and time overhead associated therewith is reduced and the overall calculation speed increased.

System 10 is configured and operated so as to evaluate Eqs. 5 and 6 efficiently. The sub-matrices A', B' are stored (e.g., in LOG domain) in cache 20. In the preferred embodiment, the cache of the kth CU, denoted by $ in CU-k, has stored therein the corresponding values of the A', B' matrices, that is, the cache of CU-k has stored therein the kth column of the A' matrix A'(j,k) and the kth column of the B' matrix B'(i,k). The functional operation of CU-k is illustrated in FIG. 4, wherein kth cache 30 has stored therein values 32 comprising A'(1,k), A'(2,k), . . . A'(j,k) . . .

A'(M−1,k), A'(M,k) and values 34 comprising B'(1,k), B'(2, k), . . . B'(i,k) . . . B'(M−1,k), B'(M,k), for the two sub-matrixes B' and A' satisfying Eq. 3. FIG. 4 illustrates functionally how each CU-k operates to evaluate Eqs. (5) and (6).

Referring now to FIG. 4, data F'(n,p) (in LOG domain) is coupled via F-BUS 16 to input 38 of CU-k of PPU-k and thence to input 39 of LOG adder 40 (i.e., ADD LOG) of each of the k computing units for k=1 . . . k=K (in this example, K=64). As used herein, the words "LOG adder" refer to a circuit or other apparatus or means which adds numbers, in this case, numbers in the LOG domain. Such adders are conventional.

Initially, Row-A pointer 42 of cache 32 containing values A'(j,k) points to a first A' value A' (1,k) and Row-B pointer 44 of cache 34 containing values B'(i,k) points to a first B'-value B'(1,k), where the (first A'-value)=log (first A-value) and the (first B'-value)=log (first B-value), and similarly for other variables and coefficient values.

During time increment T1 (e.g., a first portion of a clock cycle) LOG input data value F'(1) is provided to first input 39 of adder 40. At that time, cache memory 34 holding B' (1,k) is coupled, for example, via switch 46 to second input 48 of adder 40. Then F'(1,k) and B'(1,k) are summed in LOG adder 40 and this first LOG sum {F'(1)+B'(1,k)} is provided to output 49 of LOG adder 40. This first LOG sum is fed back to third input 52 of LOG adder 40 for use during the second portion T2 of a dock cycle.

During second clock cycle portion T2, the value corresponding to ROW-A pointer, e.g., A'(1,k) of cache portion 32 holding A'(j,k) is coupled via switch 46 in its alternative position to input 48 of LOG adder 40. A'(1,k) is thereby added to the first LOG sum {F'(1)+B'(1,k)} to produce a second LOG sum {F'(1)+B'(1,k +A'(1,k)} which is then sent via output 50 to ALOG-k or k', for conversion back to the NORMAL domain, thereby yielding:

$$F(1)*B(i,k)*A(j,k), \quad (7)$$

This operation is performed simultaneously in all PPU-k's for F(1) during a first clock cycle, i.e., F(k)=F(1) for that clock cycle. Those of skill in the art will understand based on the description herein, that the terms or values in the first and second LOG sums can be permuted and the first and second LOG sums performed in any order.

The above described process then repeats for each subsequent value of F, i.e., F(2), F(3) . . . F(N), and the results are summed in each ACU-K. When the row pointers reach the bottom of each stack, they are reset to the first row. This continues until i=j=M, so that $$F(p)*B(i,k)*A(j,k) Ax \quad (8)$$

is evaluated for all i, j and p in each of the k parallel processors. By loading the F(p) for each CU, then the values for each k are available at substantially the same time, i.e., each PPU provides a value each clock cycle. The results accumulated by ACU's 24 are sent to the parallel inputs of PTSB 26 from whence they. are serially delivered to XOUT BUS 28. Thus, the desired MMA output X specified in Eq. (5) is obtained.

The MMA continues until all F values in the current sample have been processed, then the system resets, and begins to process a new set of F values. This is determined by the user depending upon the number of data samples being operated on. The reset counter can be implemented in hardware or software, and tells system 10, 10' when the end of the current data sample F has been reached. Reset counters are, individually, well known in the art.

By adjusting the reset of PPU's, different types of functions can be evaluated. For example, compare Eqs. (9) and (10), where k is, for example, an index defining the computing unit and F"(i,j) refers to data provided in matrix form:

$$X(k) = \sum_{j=1}^{M} \sum_{i=1}^{M} F''(i,j) * B(i,k) * A(j,k), \quad (9)$$

$$X_j(k) = A(j,k) \sum_{i=1}^{M} F''(i,j) * B(i,k). \quad (10)$$

Different accumulation times are used, with the accumulation times for Eq. (10) being shorter than for Eq. (9). For example, in Eq. (9) accumulation takes place over M×M data input intervals and for Eq. (10) accumulation is only needed over M data input intervals.

FDCT and IDCT are example of transformations which can be performed in the manner described herein. Only about one-fourth of the cache memory is needed for the MMA method described herein of implementing Eq. (8)–(9) than for evaluating X=F * C directly by MA. Also, a FLYing-DFT transformation can be done in about one-tird less time in the MMA manner described herein. The reductions in cache memory and reduction in execution time are significant advantages.

Figure 5:
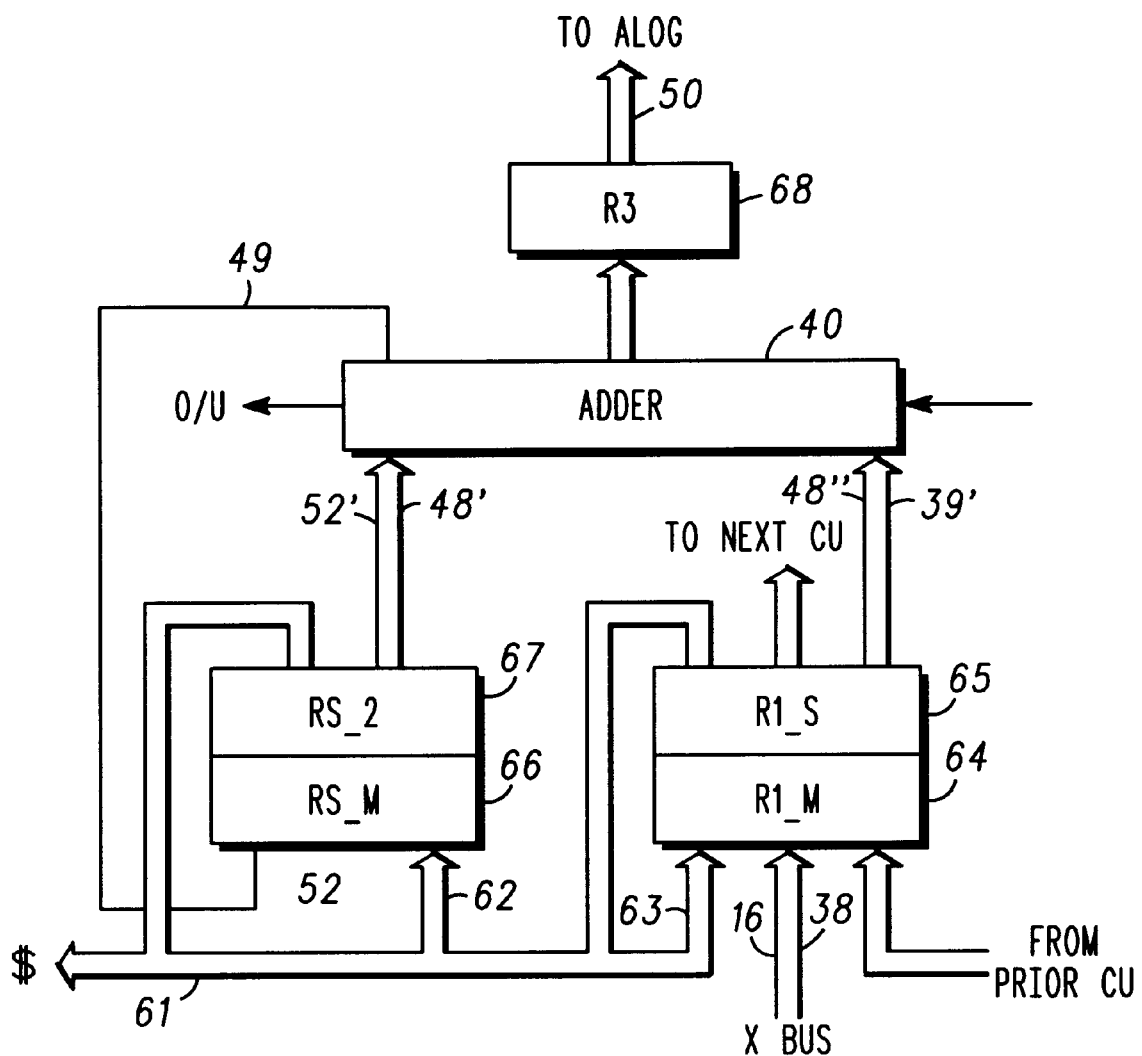
FIG. 5 is a simplified block diagram illustrating in further detail an Arithmetic Logic Unit (ALU) of the system of FIGS. 2–3, according to the present invention.

FIG. 5 is a simplified block diagram illustrating Arithmetic Logic Unit (ALU) 60 of system 10. ALU 60 executes what is functionally illustrated in FIG. 4. Like reference numbers are used to identify functionally equivalent elements. Registers 64, 66 (denoted as R1-M and R2-M, respectively) are master registers and Registers 65, 67 (denoted as R1-S and R2-S respectively) are slave registers coupled, respectively, to master registers 64, 66. Register 68 (denoted as R3) is the output buffer of ALU 60, and is coupled to ALU output 50. Adder 40 performs the function described in connection with FIG. 4. Bus 61 couples to cache 20 (denoted by $).

FIG. 6 shows simplified table 80 illustrating how the means and method of the present invention produces a deired result. FIG. 6 is a NORMAL domain representation. Headers 88 identify the CU-k in which the products (log sums) are being evaluated, for each data value F(p).

Table 80 represents the situation where N=64 and M=8. Referring now to FIGS. 4 and 6 together, bracket 82 in FIG. 6 (i.e., ROWS 1–8) show the coefficient values stored in cache portion 32 of the 8×64 matrix A(j,k) and bracket 84 in FIG. 6 (i.e., ROWS 9–16) show the coefficient values stored in cache portion 34 of the 8×64 matrix B(i,k). The coefficient values for each CU-k are different, as indicated in the upper portion of table 80, above dashed line 85. The values stored in cache portions 32 and 34 remain unchanged during the MMA operation for each set of data values F(p). this means that the cache values only need be loaded once for each F sequence. In that sense, upper portion (above line 85) is static, i.e., it does not change with successive clock cycles for p=1 to p=M(i−1)+j. However, as explained in connection with FIG. 4, the particular rows of cache 82, 84 which are read out by pointers 42, 44 change with each dock cycle.

Data stream 86 of F(p) for p=1, 2, 3, . . . 64 is presented to each of the CU's, one data value per clock cycle. During the first clock cycle after reset, F(1) is provided to all CU's, during the second clock cycle F(2) is presented to all CU's, and so forth until the F(p) vector (or matrix) is completed when, for example, the last value F(64) is input substantially simultaneously to all CU's. Thus, data input stream 86 is not to be interpreted in FIG. 6 as being associated with individual CU's above line 85. Rather, data stream 86 in FIG. 6 is associated with sums 90 shown below line 87.

At the bottom of table 80 below line 87, each of rows 90 corresponds to a single PPU-k, illustrating the partial products being summed by the corresponding ACU-k to produce, the elements in the resulting output X matrix for X=F*C, as indicated by 92.

Referring now to FIGS. 5–6 together, during clock cycle portion T1, first data value F'(1) is, for example, transferred from F-BUS 16 via input 38 into Register R1 and thence via input 39' to adder 40. This occurs for all PPU-k, that is, the first F' value, e.g., F'(1) is input to all CU-k during the first clock cycle. During the next clock cycle, the next F' value, e.g., F'(2), is input to all CU-k, and so on. During portion T1 of each dock cycle, coefficients B'(i,k) are transferred in sequence from cache portion 34 to input 62 of register R2 and from thence via input 48' to LOG adder 40. This occurs in each ALU-k, for k=1 to k=K (in this example, K=64).

The LOG sum {B'(1,k)+F'(1)} which is equivalent to [B(1,k))*F(1)] in the NORMAL domain, is output on bus 49 from LOG adder 40. During clock portion T2 it is sent to input 52 of register R2, from whence it is transferred via 52' to LOG adder 40. During T2, cache value A'(1,k) is sent to input 63 of register R1 and thence via 48" to LOG adder 40. The LOG sum {A'(1,k)+B'(1,k)+F'(1)}, which is equivalent to [A(1,k)*B(1,k)*F(1)] in the NORMAL domain, is now produced by LOG adder 40 and sent via buffer register R3 to output 50 which is coupled to the corresponding ALOG unit. This occurs for each PPU-k.

As each input data value F(p) is considered during the subsequent clock cycles, the resulting values of [A(j,k)*B(i,k)*F(p)] which are in the NORMAL domain after passing through corresponding ALOG-k unit 22,22' are summed in corresponding ACU-k 24 to produce sums 92 shown in the lower portion of table 80 for the first 64 values of F. Since M=8 and there are 64 CU's in the examples of FIG. 2–3, 64 values of F can be handled at a time.

Thus, in the NORMAL domain where F(n,p)=F(1,p)=F(p) where n=1 and for p=1 to 64 (in this example):

PPU-1 produces the sum:

$$X(1,1)=F(1)*B(1,1)*A(1,1)+F(2)*B(1,1)*A(2,1)+F(3)*B(1,1)*A(3,1)+\ldots +F(64)*B(8,1)*A(8,1)\ldots ; \quad (11)$$

PPU-2 produces the sum:

$$X(1,2)=F(1)*B(1,2)*A(1,2)+F(2)*B(1,2)*A(2,2)+F(3)*B(1,2)*A(3,2)+\ldots +F(64)*B(8,2)*A(8,2)\ldots ; \quad (12)$$

and continuing so that

PPU-9 produces the sum:

$$X(1,9)=F(1)*B(1,9)*A(1,9)+F(2)*B(1,9)*A(2,9)+F(3)*B(1,9)*A(3,9)+\ldots +F(9)*B(2,9)*A(1,9)+\ldots +F(64)*B(8,9)*A(8,9)\ldots \{13)$$

and continuing so that

PPU-64 produces the sum:

$$X(1,64)=F(1)*B(1,64)*A(1,64)+F(2)*B(1,64)*A(2,64)++F(3)*B(1,64)*A(3,64)+\ldots +F(64)*B(8,64)*A(8,64)\ldots \quad (14)$$

By way of illustration, the last term above for the general case of F(n,64) where n=n (rather than n=1 in Eq. (14) above) is shown by Eq. 15 below:

$$X(n,64)=F(n,1)*B(1,64)*A(1,64)+F(n,2)*B(1,64)*A(2,64)++F(n,3)*B(1,64)*A(3,64)+\ldots +F(n,64)*B(8,64)*A(8,64)\ldots \quad (15)$$

For compactness of representation, the primes used to indicate LOG values are omitted in upper portions. 82, 84 of FIG. 6 it being understood that the values are stored in or available from the cache in LOG domain form. Also, for simplicity, the parentheses and commas used in the text above (e.g., see Eqs. (11)–(15), etc.) are omitted in the lower portion of FIG. 6. In this way, A11 in FIG. 6 corresponds to A(1,1) in the above-noted equations, A12 to A(1,2), B11 to B(1,1), B12 to B(1,2), . . . A164 to A(1,64), B864 to B(8,64), and so forth. FIG. 6 illustrates the results for n=1, that is, F(n,p)=F(1,p) and where F (1,p) is written in the more compact form as F(p), for p=1 to 64 in this example.

The results shown in Eqs. (11)–(15) are the desired product X. It will also be apparent that the above-described arrangement requires less cache memory that is required if the entire N×N matrix C is held in the cache in order to evaluate the equation X=F*C directly and, that system 10, 10' can perform such calculations more quickly. Thus, the microchip in which system 10, 10' is integrated can be made smaller and, in many situations, faster.

Having thus described the invention, those of skill in the art will understand that the invented means and method can be used in connection with many applications of great practical significance and that it is not limited merely to the application and arrangement described here for purposes of illustration and explanation. Accordingly, it is intended to include those further applications and arrangements that fall with the scope of the claims that follows, as understood and practiced by those of skill in the art.

We claim:

1. A computer system for evaluating expressions of the type F(n,p)*C(p,k) where C(p,k) is a matrix satisfying the relationship C(p,k)=B(i,k)*A(j,k) where A(j,k) and B(i,k) are sub-matrices and i and j are indices in the range of 1 to M, k is an index in the range of 1 to K, n is an indice, p is a function of i, and K and M are integers, the system comprising a subsystem including:

a memory space for receiving (a) the sub-matrix Ao,k) having a first logical pointer initially to a first A-value, and (b) the sub-matrix B(i,k) [and] having a second logical pointer initially to a first B-value;

a data input for receiving input data values F in vector or matrix form;

a LOG adder coupled to the data input and to the memory space, wherein said LOG adder adds a first input data value in LOG form plus the first B-value in LOG form to obtain a first LOG sum, and then adds the first LOG sum plus the first A-value in LOG form to obtain a second LOG sum;

an ALOG circuit for receiving said second LOG sum and converting it to a product value in NORMAL form; and at least one accumulator (ACU) for adding successive product values for different input data values combined by said LOG adder with the same or other values of sub-matrices A(j,k) and B(i,k) for different values of i, j.

2. The system of claim 1 wherein the computer system includes K parallel subsystems, where k=1 to K, each subsystem k receives a first data input value F(n,p) in a first clock cycle, where p=M(i−1)+j and M is a dimension of matrices A(j,k) and B(i,k), so that a first data input value F(1,1) is combined with first values of A(j,k) and B(i,k) for i=j=1 in each k parallel subsystem.

3. The system of claim 2 wherein the parallel subsystems, during each subsequent clock cycle, combine and accumulate another data input value F(n,p) with corresponding values of values of A(j,k) and B(i,k) according to the indices i, j.

4. The system of claim 1 wherein C(p,k) is a matrix of dimensions N×W and B(i,k) is a matrix of dimensions M×W and A(j,k) is a matrix of dimensions M×W and wherein p=M(i−1)+j.

5. The system of claim 1 wherein C is a matrix of dimensions N×N, B is a matrix of dimensions M×N, A is a matrix of dimensions M×N, F has the values F(n,p), and wherein the system evaluates $$X(n,k) = \sum_{i=1}^{M} \sum_{j=1}^{M} F(n,p) * B(i,k) * A(j,k),$$

where i, j are indices in the range 1 to M, k is an index in the range k=1 to K and where n and p are indices and p=M(i−1)+j, wherein the system comprises K LOG adders operating in parallel, and the ACU associated with each LOG adder and ALOG unit combination accumulates product values until reset when i=j=M.

6. The system of claim 1 wherein the system further comprises K parallel subsystems, where k=1 to K, wherein each subsystem k computes $$X(n,k) = \sum_{i=1}^{M} \sum_{j=1}^{M} F(n,p) * B(i,k) * A(j,k),$$

where i, j are indices in the range 1 to M wherein M is a dimension of matrices A and B and where p=M(i−1)+j.

7. The system of claim 6 wherein the system computes the product F(n,p)*B(i,k)*A(j,k) for particular values of i, j and p is computed in a single clock cycle.

8. A method for evaluating expressions of the type F*B*A using K parallel processors (PPU-k) each having a LOG domain calculation unit (CU-k), wherein CU-k outputs pass through an anti-log unit (ALOG) to an accumulator (ACU) for each CU-k and where F, B and A are NORMAL domain variables representable as matrices, said method comprising the steps of:

converting A and B into LOG domain representation A' and B';

converting data input F into LOG domain representation F';

supplying values F'(n,p), A'(j,k) and B'(i,k) to said CU-k, where i and j are indices in the range of 1 to M, k is an index in the range of 1 to K, n is an indice, p is a function of i, and K and M are integers;

in said CU-k, combining F'(n, p), A'(j,k) and B'(i,k) to produce a LOG sum $S_n'(i,j,k)$=SUM {F'(n,p)+A'(j,k)+B'(i,k)} for specific values of i,j and p for each k, where M is a dimension of the matrices A'(j,k) and B'(i,k);

converting in said ALOG, said LOG sum $S_n'(i,j,k)$ from the LOG domain to a corresponding NORMAL domain product $P_n(ij,k)$=antilog $S_n'(i,j,k)$ for each k;

repeating said supplying, combining and converting steps for different values of i, j for each k; and accumulating said $P_n(i,j,k)$ for different values of i, j for each k to produce a NORMAL sum $S_n(k)$ for each PPU-k.

9. The method of claim 8 further comprising the step of combining said $S_n(k)$ in a buffer.

10. The method of claim 9 ftrther comprising the step of entering the $S_n(k)$ into the kth tap of a K tap shift register output buffer.

11. The method of claim 8 further comprising the step of adding F'(n,p) and one of A'(,k) or B'(i,k) to produce an intermediate LOG sum $S_n''(i,k)$ or $S_n''(j,k)$ and adding S" to the other of A'(j,k) or B'(i,k) to produce the LOG sum $S_n'(i,j,k)$=F'(n,p)+A'(,k)+B'(i,k).

12. The method of claim 11 further comprising the step of producing the intermediate LOG sum during a first portion of a clock cycle and producing the LOG sum during a second portion of the same clock cycle.

13. The method of claim 8 further comprising the step of storing A and B in a cache memory.

14. The method of claim 8 further comprising the step of storing A' and B' in a cache memory.

15. The method of claim 14 wherein the storing step occurs prior to the second converting step.

16. An apparatus for evaluating expressions of the type F*B*A, where F, B and A are vectors or matrices or a combination thereof, comprising:

a LOG unit for converting B, A, and F to LOG domain values B', A' and F';

K parallel processors (PPU-k), each including a LOG domain calculation unit (CU-k) having an input coupled to an output of the LOG unit;

a pluraltiy of anti-log units (ALOGs), each coupled at least part time to an output of a CU-k;

a plurality of accumulators (ACUs) coupled to outputs of the ALOGs;

wherein, said CU-k combines F'(p), A'(j,k) and B'(i,k) for specific values of i,j to produce a LOG sum $S_k'(i,j,p)$=F'(p)+A'(j,k)+B'(i,k) for said specific values of i, j, where i and j are indices in the range of 1 to M, k is an index in the range of 1 to K, n is an indice, p is a finction of i, and K and M are integers wherein said ALOGs convert said LOG sum $S_k'$ from the LOG domain to an equivalent first product $P_k$ (i,j,p) in the NORMAL domain for each PPU-k;

said ACUs accumulate said first product $P_k$ (i,j,p) for different values of i, j to produce a NORMAL sum $S_k$ for each PPU-k.

17. The apparatus of claim 16 wherein said CU-k adds F'(p) and one of A'(j,k) or B'(i,k) to produce an intermediate LOG sum $S_k''(i,p)$ or $S_k'(j,p)$ and adds $S_k''$ to the other of A'(j,k) or B'(i,k) to produce the LOG sum $S_k'(i,j,p)$=F'(p)+A'(j,k)+B'(i,k).

18. The apparatus of claim 16 further comprising an output buffer coupled to the ACUs.

19. The apparatus of claim 18 wherein the output buffer comprises a K tap shift register, each tap k receiving an output from a corresponding ACU-k.

20. The apparatus of claim 16 wherein F is a matrix F(n,p) and wherein $S_k$=$S_k(n)$ with n=1, and the K parallel processors, ALOGs, and ACUs recompute $S_k(n)$ for further values of n.

21. A method for computing F*C where F and C are matrices, wherein F'=log F, B'=log B and A'=log A, comprising the steps of:

storing in a memory values of submatrices B(i,k) and A(j,k) satisfying the relation C(p,k)=B(i,k)*A(j,k) where p depends on i, j, where p is a function of i, j, i and j are indices in the range of 1 to M, k is an index in the range of 1 to K, n is an indice, and K and M are integers said storing being in either NORMAL or LOG form;

combining A', B' and F' in parallel log adders to obtain for each k a LOG sum $S_k'(i,j)$=F'+B'+A' for each i, j;

converting the LOG sum $S_k'(i,j)$ to a NORMAL product $P_k(i,j)$ for each k; and accumulating $P_k(i,j)$ to form a NORMAL domain sum $S_k$ for successive values of F and all i,j.

22. The method of claim 21 wherein p=M(i−1)+j where M is a dimension of the matrices A and B.

23. The method of claim 21 wherein the accumulating step sums $P_k(i,j)$ recursively for all i,j.

24. An apparatus for computing F*C where F and C are matrices, comprising:

a temporary memory for storing, in either NORMAL or LOG form, values of submatrices B(i,k) and A(j,k) satisfying the relation C(p,k)=B(i,k)*A(j,k) where p depends on i, j, i and j are indices in the range of 1 to M, k is an index in the range of 1 to K, n is an indice, and K and M are integers;

a converter for forming F'=log F, B'=log B and A'=log A;

parallel log adders for combining A', B' and F' to obtain for each k a LOG sum $S_k'(i,j)$=F'+B'+A' for each i, j;

parallel antilog converters for converting the LOG sum $S_k'(i,j)$ to a NORMAL product $P_k(i,j)$ for each k; and parallel accumulators for summing $P_k(i,j)$ to form a NORMAL domain sum $S_k$ for successive values of F and all i,j.

25. The apparatus of claim 24 wherein p=M(i−1)+j where M is a dimension of the matrices A and B and i, j run from 1 to M.

26. The apparatus of claim 24 wherein the parallel accumulators sum $P_k(i,j)$ recursively for all i, j to form a NORMAL domain sum $S_k$ for successive values of F.

* * * * *